3,297,460
PHOSPHATE GEL COMPOSITIONS
Eric Rau, Lawrence Township, Mercer County, and Ray Phillips, Murray Hill, N.J., and James P. Hamilton, Anne Arundel County, Md., assignors to FMC Corporation, New York, N.Y., a corporation of Delaware
No Drawing. Filed Oct. 7, 1963, Ser. No. 314,532
4 Claims. (Cl. 106—177)

This application is a continuation-in-part of our copending application Serial No. 233,134, filed October 25, 1962, now abandoned.

This invention relates to novel, bodied, thixotropic phosphate gel compositions suitable for coating dust filter media in air filters.

Viscous-impingement type industrial air filters contain porous filter media or mats through which the air is passed. The filter medium is coated with a stable, non-volatile, liquid which entraps dust particles as they pass through the filter and prevents them from becoming reentrained in the air stream. However, loss of this liquid coating during use results in a lowering of the cleaning capacity of the filter. The liquid may be blown off the filter media by the high air velocities encountered, for example, with diesel engine filters. Moreover, when the filter medium is tightly wound around spools, as in the recently developed automatic replacement filters, the liquid coating tends to be squeezed out.

In the past, these losses have been reduced by bodying the liquid with a semi-soluble resin or other gelling agent. However, these resin-liquid compositions tend to decrease in viscosity at the temperatures reached with diesel engine filters. If gelling agents, such as a finely-divided silica, are used, as much as 7%, based on the mixture, is ordinarily required for satisfactory thickening. This amount of silica in the liquid can clog spray nozzles and associated filters generally used in coating the mat. Furthermore, the mixture becomes thicker upon aging due to syneresis resulting in a reduction in the ability to entrap dust particles. Syneresis may also occur during storage causing the liquid to separate from the gel structure. The separated liquid will then drain out of the mat leaving a higher concentration of gel solids on the surface of the mat. The overall effect is a loss in dust filtering capacity.

It is an object of this invention to provide liquid-coated filter media for use in high air-speed filters and in automatic-type filters.

Another object is to provide viscous liquids which can be readily sprayed onto filter mats, yet which do not squeeze out when the mats are tightly wound on rollers.

A further object is to provide stable, gelled liquids for filter mats which will not exude during storage nor drain out at elevated temperatures.

These and other objects will become apparent from the following description of this invention.

We have now discovered improved coating compositions for viscous-impingement filters which comprise a triorganic phosphate of the formula

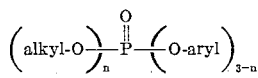

in which n is 0–1, the alkyl radical is of 1–8 carbon atoms and the aryl radical is derived from tar acid, 0.5–5% by weight of substantially pure pyrogenic silica having a particle size not greater than 0.025 micron, and 0.1–2.5% by weight of surface active agent selected from the group consisting of non-ionic surfactants, cationic surfactants, polyglycols and water. These coating compositions are stable, bodied liquids which can be readily sprayed without clogging filters and nozzles, and which do not tend to form a liquid exudate that can drain off the filter mat.

By mixing the organic phosphate with finely-divided pyrogenic silica and certain surface active agents, considerably less silica is required than was previously thought necessary to increase the viscosity of the liquid to the desirable range. Moreover, we have found that the gelled liquid is surprisingly fluid under conditions close to spray conditions. Tricresyl phosphate can thus be gelled or thickened in accordance with this invention to a viscosity in the range of about 10,000 to over 50,000 centipoises (by Brookfield viscosimeter at 6 r.m.p.), yet, this same liquid may have a viscosity as low as about 200 centipoises for spraying purposes (as measured by a rheometer simulating spray conditions).

The action of the coating on the filter mat for entrapment of dust particles is believed to be that of "wetting." When a minute layer of dust has been captured by the liquid, the particles become coated by seepage of the liquid through the layer. Thus, in a short time, which may be several seconds to a few minutes, the first layer of dust is completely wetted by the liquid and liquid is again open to the air-borne dust. In the past, the concentration of thickening agent in the coating was so high that the capacity of the filter to trap dust was sharply decreased. By the practice of this invention, although its viscosity is very high, our composition has sufficient wetting capacity to seep through and wet the dust already entrapped and is thereby able to capture further amounts of dust particles. In other words, the composition is viscous enough to remain on the filter mats, yet the capacity of the liquid to trap dust is not significantly reduced.

Another aspect of our invention involves preventing drainage of liquid from the filter mat by syneresis. As mentioned earlier, this phenomenon causes separation of liquid from the solid component of the gel, and ultimately from the filter mat, thus leaving a very thick, high-solids substance behind. This drainage severely lowers the wetting characteristics and the dust-catching capacity of the remaining gel. We have found that the addition of a small amount of a soluble resinous material, such as cellulose acetate butyrate, to the organic phosphate prior to adding the pyrogenic silica further reduces drainage. Accordingly, if the organic phosphate is first thickened with cellulose acetate butyrate, very little loss of separated liquids from the gel will occur. Moreover, the silica requirement is further decreased in this manner.

The degree of physical dispersion of the silica and surface active agent in the organic phosphate affects the liquid viscosity. The viscosities will tend to be somewhat higher with a high-speed blender than with an ordinary stirrer. Ball mills or roller mills may also be used to prepare satisfactory dispersions. Elevated temperatures during the disperson step should be avoided, since heat will adversely affect gel structure. We normally perform the mixing operation at room temperature.

The silica which we have used in preparing the high-viscosity compositions of this invention is of the type known as "pyrogenic silica." It is prepared by reacting almost pure silicon tetrachloride and water in a vapor phase to produce silicon dioxide and hydrogen chloride. The silica so produced is a very pure powder, of the order of 99% pure, having a particle size not greater than about 0.025 micron. Pyrogenic silicas having particle sizes as small as about 0.007 are presently available. Preferably, the pyrogenic silica has a particle size of about 0.015–0.020 micron.

As the surface active agent, non-ionic surfactants, such as polyoxyethylene sorbitan monooleate, polyoxyethylene sorbitan monooleate, polyoxyethylene sorbitan tristearate and sorbitan monostearate, and cationic surfactants, such as alkyl-trimethylammonium chloride, dialkyl dimethylammonium chloride, octadecenyl trimethylammonium chloride and tetraethylammonium bromide, are extremely effective in increasing the body of the organic phosphate composition. Polyglycols such as polyethylene glycols and polypropylene glycols are also suitable surface active agents for this invention. Oddly enough, one of the most effective surface active agents, in small quantities, is water. The presence of a minor quantity of water in silica-gelled organic phosphate increases the thickness of the gel as much as 35 times that of only the phosphate and silica alone. If an anionic surfactant is used, a small amount of water must be present. If it is desired, mixtures of different surface active agents may be added. In all of these surfactant-treated gels, the body effect is stable for many days.

About 0.5–5% of pyrogenic silica, by weight of total mixture, will be required for preparing satisfactory gelled liquids, and preferably 1–2.5% is sufficient for obtaining excellent gels. If the liquid phosphate is first thickened with resin, the amount of silica required will preferably be in the range of about 0.5–1.5%. For the pre-thickened liquids, we add about 1.5–3.5% cellulose acetate butyrate resin by weight of total mixture. This range is satisfactory for preparing stable gels and for preventing substantial loss through syneresis. As for the surface active agent, an amount in the range of about 0.1–2.5% by weight of total mixture is generally adequate for obtaining useful gels. Peferably 0.5–2% of surface acive agent is used.

The triorganic phosphates which are useful in accordance with this invention are those having the formula

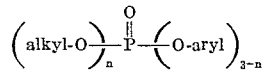

in which $n$ is 0–1, the alkyl radical is of 1–8 carbon atoms and the aryl radical is derived from tar acid. The term "tar acid" is intended to include those acids which can be extracted with dilute caustic soda from tars such as coal tar, wood tar and lignite tar. Crude tar acid extracts generally contain phenol, ortho-cresol, meta-cresol, para-cresol and the six isomeric xylenols, and they can be fractionated to give various grades of these products. The term "tricresyl phosphate" is intended to include esters made from phosphoric acid and a mixture of alkyl phenols known as "cresylic acid" which may be derived from coal tar, wood tar, or petroleum distillate. Suitable alkyl radicals include methyl, ethyl, propyl, isopropyl, butyl, amyl, isohexyl and ethylhexyl, as well as others. Preferably the phosphate is tricresyl phosphate.

The following examples, illustrating the novel filter medium coating compositions of this invention, are presented without any intent that the invention be limited thereto. All parts and percentages are by weight.

Example I

Tricresyl phosphate, having a specific gravity of 1.194, was mixed with commercially available cellulose acetate butyrate having a butyryl content of about 48% and an acetyl content of about 6% (EAB–500–5, Eastman Chemical Products, Inc.) at 110° C. to form a 2% solution by weight. To 98.5 parts of this solution were added 1.0 part of pyrogenic silica (Cab-O-Sil M5, Godfrey L. Cabot Co.) and 0.5 part of polyoxyethylene sorbitan monooleate (Tween 80, Atlas Chemical Co.). A Waring Blendor was used to disperse the additives at room temperature. The Brookfield viscosity of this blend (using viscometer model LVF with the No. 4 spindle) was 17,000 cps. at 6 r.p.m. and 5400 cps. at 60 r.p.m., by generally following ASTM method D1824–61T.

The blend was submitted to a high shear force by passing it through two standard nozzles under constant pressure. The Castor-Severs Rheometer viscosities were 580 cps. through a 1/16-in. nozzle and 460 cps. through a 1/8-in. nozzle at a pressure of 30 p.s.i. and shear stresses of 18,036 dynes/cm.$^2$ and 33,900 dynes/cm.$^2$, respectively. The amount of material extruded was 113.1 g./min. through the 1/16-in. nozzle and 1,764 g./min. through the 1/8-in. nozzle. (These measurements were made under stresses close to those of a spray gun, by substantially following ASTM method D1823–61T, except that the above nozzles and pressure were employed.)

A second sample of the above mixture, having a Brookfield viscosity of 18,700 cps. at 6 r.p.m. and 4400 cps. at 60 r.p.m., was placed in an uncoated paper cup for 14 days. The percent of material lost by exudation through the paper fiber was 0.4%. This test shows that syneretic loss over a long period of time is inconsequential.

As a measurement of the wetting capacity of this pre-thickened gelled liquid, a drop of liquid was placed on a glass slide in contact with a thin layer of finely powdered clay. The time in which a 1 mm.-wide band of clay became wetted was about 4 2/3 min. (Since the average thickness of a single dust layer is only several microns, this wetting time is, for practical purposes, very short.)

Example II

Tricresyl phosphate was mixed in a three-roll ink mill with the same silica and surface active agent as in Example I. The mixture contained 95.5 parts of the phosphate liquid, 2.0 parts of surfactant, and 2.50 parts of silica. The Brookfield viscosities, as measured in Example I, were 49,000 at 6 r.p.m. and 6,700 at 60 r.p.m. The viscosities obtained with the Castor-Severs Rheometer were 220 cps., with the 1/16-in. nozzle and 240 cps., with the 1/8-in. nozzle.

The wetting action of this mixture was measured using the wetted clay method described in Example I. A 1-mm. band of clay was wetted in about 40 sec.

The viscosity of this mixture was also measured at various elevated temperatures. The following Brookfield viscosities were taken using LVF No. 4 spindle at 60 r.p.m. The results are compared with a commercially available coating composition thickened with a typical resin.

| Temperature, ° C. | Silica-gelled liquid viscosity, cps. | Resin-thickened liquid viscosity |
| --- | --- | --- |
| 30 | 6,250 | 7,850 |
| 40 | 6,563 | 5,250 |
| 50 | 6,875 | 3,120 |
| 60 | 6,812 | 1,125 |
| 70 | 6,563 | 125 |
| 80 | 6,000 | 100 |

Example III

Brookfield viscosities (LVF No 4 spindle) of silica-gelled tricresyl phosphate mixed with other surfactants were made using a high-speed blender to obtain the following mixtures. The viscosities of these mixtures are compared with those of two having no surface active agent present.

component a triorganic phosphate of the formula

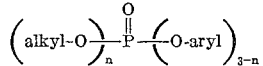

| Composition | A | B | C | D | E | | Comparison |
|---|---|---|---|---|---|---|---|
| Tricresyl phosphate | 96.0 | 95.5 | 95.5 | 95.5 | 95.5 | 97.5 | 96.0 |
| Silica | 4.0 | 2.5 | 2.5 | 2.5 | 2.5 | 2.5 | 4.0 |
| Polyoxethylene sorbitan monooleate | 1.0 | | | | | | |
| Water | | 1.5 | | | | | |
| Tetraethylammonium bromide | | | 2.0 | | | | |
| Sorbitan monostearate (25% aqueous dispersion) | | | | 2.0 | | | |
| Polyethylene glycol (molecular weight of 400) | | | | | 1.5 | | |
| Viscosity (cps.): | | | | | | | |
| 6 r.p.m | >100,000 | 25,000 | 30,000 | 44,000 | 24,000 | 700 | |
| 60 r.p.m | >10,000 | 3,600 | 3,350 | 7,000 | 4,100 | 250 | 450 |

When these compositions are sprayed on filter mats, they exhibit excellent dust cleaning properties; and the mats retain their dust cleaning properties over extended periods.

*Example IV*

Additional pyrogenic silica-gelled coating compositions were prepared from a commercially available tricresyl phosphate derived from cresylic acid containing about 10% xylenols, methyl diphenyl phosphate and 2-ethylhexyl diphenyl phosphate. The compositions and Brookfield viscosities (LVF No. 4 spindle) of these mixture are presented in the following table.

| Composition | A | B | C |
|---|---|---|---|
| Tricresyl phosphate | 95.5 | | |
| Methyl diphenyl phosphate | | 95.5 | |
| 2-ethylhexyl diphenyl phosphate | | | 95.5 |
| Silica | 2.5 | 2.5 | 2.5 |
| Polyoxyethylene sorbitan monooleate | 2.0 | 2.0 | 2.0 |
| Viscosity (cps.): | | | |
| 6 r.p.m | 49,000 | 9,500 | 12,000 |
| 60 r.p.m | 6,700 | 1,500 | 2,050 |

As will be apparent to those skilled in the art, numerous modifications and variations of the proportions and ingredients in the coating compositions illustrated above may be made without departing from the spirit of the invention or the scope of the following claims.

We claim:
1. A triorganic phosphate coating composition for viscous-impingement filters which comprises as a major component a triorganic phosphate of the formula in which $n$ is 0–1, the alkyl radical is of 1–8 carbon atoms and the aryl radical is derived from tar acid, and which contains as essential ingredients 0.5–5% by weight, based upon the total mixture, of substantially pure pyrogenic silica having a particle size no greater than 0.025 micron, and 0.1–2.5% by weight, based on the total mixture of an agent selected from the group consisting of non-ionic surfactants, cationic surfactants, polyglycols and water.

2. The coating composition of claim 1 in which the organic phosphate is tricresyl phosphate and the pyrogenic silica has a particle size of 0.015–0.020 micron.

3. The coating composition of claim 2 in which 1.5–3.5% by weight of cellulose acetate butyrate is also present.

4. A coating composition for viscous-impingement filters which comprises tricresyl phosphate, 0.5–1.5% by weight of substantially pure pyrogenic silica having a particle size of 0.015–0.020 micron, 0.5–2% by weight of a non-ionic surfactant, and 1.5–3.5% by weight of cellulose acetate butyrate resin.

References Cited by the Examiner

UNITED STATES PATENTS

| 2,199,385 | 5/1940 | Bass | 106—177 |
| 2,823,183 | 2/1958 | Lonstrup | 252—88 |
| 2,960,467 | 11/1960 | Martinek et al. | 252—317 |
| 3,016,304 | 1/1962 | Preston et al. | 106—287 |
| 3,133,884 | 5/1964 | Graham et al. | 252—88 |

ALEXANDER H. BRODMERKEL, *Primary Examiner.*

L. HAYES, *Assistant Examiner.*